: US010097032B2

United States Patent
Hu et al.

(10) Patent No.: US 10,097,032 B2
(45) Date of Patent: *Oct. 9, 2018

(54) MOBILE TERMINAL AND CHARGING METHOD

(71) Applicant: HISENSE MOBILE COMMUNICATIONS TECHNOLOGY CO., LTD., Qingdao (CN)

(72) Inventors: Ermeng Hu, Qingdao (CN); Chunqian Li, Qingdao (CN); Wenjuan Du, Qingdao (CN)

(73) Assignees: HISENSE MOBILE COMMUNICATIONS TECHNOLOGY CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 248 days.

This patent is subject to a terminal disclaimer.

(21) Appl. No.: 15/068,883

(22) Filed: Mar. 14, 2016

(65) Prior Publication Data

US 2017/0040817 A1 Feb. 9, 2017

(30) Foreign Application Priority Data

Aug. 5, 2015 (CN) .......................... 2015 1 0473396

(51) Int. Cl.
*H02J 7/00* (2006.01)
*H02J 7/04* (2006.01)

(52) U.S. Cl.
CPC ............ *H02J 7/045* (2013.01); *H02J 7/0006* (2013.01); *H02J 2007/0062* (2013.01); *H02J 2007/0096* (2013.01)

(58) Field of Classification Search
CPC .. H02J 7/045; H02J 7/0006; H02J 2007/0062; H02J 2007/0096
(Continued)

(56) References Cited

U.S. PATENT DOCUMENTS

| 5,524,044 A * | 6/1996 | Takeda .................. H04B 1/3833 |
| | | 455/571 |
| 9,362,773 B2 | 6/2016 | Tuli |

(Continued)

FOREIGN PATENT DOCUMENTS

| CN | 102684268 A | 9/2012 |
| CN | 103066340 A | 4/2013 |

(Continued)

OTHER PUBLICATIONS

Chinese Office Action for 201510473396.6, No Date, 13 pages.

(Continued)

*Primary Examiner* — Phallaka Kik
(74) *Attorney, Agent, or Firm* — Harness, Dickey & Pierce, P.L.C.

(57) ABSTRACT

The application disclose a mobile terminal, a method for charging by a power source adapter for charging directly and a method for charging a mobile terminal, where firstly the power adaptor for charging directly is configured to communicate wirelessly with the mobile terminal, and then a strategy to identity the type of charging is designed in the mobile terminal dependent upon differently configured communication pins of a different charging device, so that the mobile terminal identifies automatically the type of the external device. Also a specialized rapid charging mode is designed for the power adaptor for charging directly, the battery of the mobile terminal being charged routinely is charged directly at large current by charging voltage output by the power adaptor for charging directly, and the volt value (Continued)

of the charging voltage is adjusted dynamically according to the varying voltage of the battery.

19 Claims, 8 Drawing Sheets

(58) Field of Classification Search
USPC .................. 320/114, 115, 108, 134, 162
See application file for complete search history.

(56) References Cited

U.S. PATENT DOCUMENTS

| | | | | |
|---|---|---|---|---|
| 9,647,474 | B2* | 5/2017 | Fathollahi | H02J 7/0044 |
| 9,812,878 | B1 | 11/2017 | Stieber et al. | |
| 2006/0149855 | A1 | 7/2006 | Fukuda | |
| 2008/0291879 | A1* | 11/2008 | Duff | H02J 7/0068 |
| | | | | 370/338 |
| 2011/0309789 | A1* | 12/2011 | Prasad | H02J 7/0052 |
| | | | | 320/107 |
| 2012/0212203 | A1* | 8/2012 | Harrison | H02M 3/156 |
| | | | | 323/283 |
| 2013/0197748 | A1* | 8/2013 | Whitaker | G01M 17/00 |
| | | | | 701/34.4 |
| 2014/0139046 | A1* | 5/2014 | Chowdary | H02J 7/0055 |
| | | | | 307/130 |
| 2014/0341318 | A1* | 11/2014 | Pourkhaatoun | H04B 1/0475 |
| | | | | 375/297 |
| 2015/0008749 | A1* | 1/2015 | Rhee | G06F 1/266 |
| | | | | 307/80 |
| 2015/0194833 | A1* | 7/2015 | Fathollahi | H02J 7/0044 |
| | | | | 320/114 |
| 2016/0197732 | A1* | 7/2016 | Burnett | H04L 12/10 |
| | | | | 320/137 |
| 2017/0010659 | A1* | 1/2017 | Park | G06F 1/26 |
| 2017/0040810 | A1* | 2/2017 | Hu | H02J 7/0036 |
| 2017/0040813 | A1* | 2/2017 | Hu | H02J 7/022 |

FOREIGN PATENT DOCUMENTS

| | | | | |
|---|---|---|---|---|
| CN | 103236568 | A | | 8/2013 |
| CN | 103354376 | A | | 10/2013 |
| CN | 203747485 | U | | 7/2014 |
| CN | 104253456 | A | | 12/2014 |
| CN | 104393627 | | | 3/2015 |
| CN | 104796011 | A | | 7/2015 |
| CN | 103236568 | B | | 3/2016 |
| EP | 1094587 | A1 | * | 4/2001 ......... H01M 6/5061 |
| JP | 2001142837 | A | * | 5/2001 |
| JP | 2007267498 | A | | 10/2007 |

OTHER PUBLICATIONS

Office Action from Chinese Application No. 201510473365.0 dated Oct. 28, 2016 (4 pages).

Office Action from Chinese Application No. 201510473365.0 dated Jun. 13, 2017 (3 pages).

Office Action from Chinese Application No. 201510473330.7 dated Dec. 30, 2016 (11 pages).

Office Action from Chinese Application No. 201510473330.7 dated Jul. 25, 2017 (3 pages).

Office Action from Chinese Application No. 201510473330.7 dated Nov. 24, 2017 (4 pages).

* cited by examiner

MOBILE TERMINAL AND CHARGING METHOD

CROSS-REFERENCE TO RELATED APPLICATION

This application claims the benefit and priority of Chinese Patent Application No. 201510473396.6 filed Aug. 5, 2015. The entire disclosure of the above application is incorporated herein by reference.

FIELD

The present disclosure relates to the field of Direct-Current (DC) charging and particularly to a mobile terminal, a method for charging by a power source adapter for charging directly and a method for charging a mobile terminal.

BACKGROUND

This section provides background information related to the present disclosure which is not necessarily prior art.

At present, portable mobile terminals have been widely applied in numerous aspects of people's life, and have become a leading factor in the development of the semiconductor industry. The existing portable mobile terminals are generally provided with chargeable batteries to supply power to system circuits in the products. As an increasing number of functions supported by the portable products are emerging, their system circuits also consume more and more power, and given a limited capacity of the batteries, the products operate for a shorter and shorter period of time after the batteries are charged, so that the batteries have to be charged more and more frequently.

SUMMARY

This section provides a general summary of the disclosure, and is not a comprehensive disclosure of its full scope or all of its features.

In an aspect, an embodiment of the application further provides a mobile terminal including a battery, a USB interface, a wireless communication module, and a microprocessor, wherein the battery is configured to store electrical energy; the USB interface is configured to be engaged with an external device; the wireless communication module is configured to transmit and receive a wireless signal; the microprocessor is configured, upon detecting an external device being inserted into the USB interface, to start the wireless communication module to search for devices which can communicate wirelessly therewith, if the found devices comprise the external device connected with the USB interface, to determine that the external device is a power source adaptor for charging directly, and to be connected wirelessly with the power source adaptor for charging directly, if they are connected successfully, to exchange data with the power source adaptor for charging directly through the wireless communication module, to detect voltage of the battery, and if the voltage of the battery lies in a range delimited by preset direct charging threshold, to control charging voltage output by the power source adaptor for charging directly to charge the battery directly, and to determine from the current voltage of the battery the value of the charging voltage output by the power source adaptor for charging directly.

In another aspect, an embodiment of the application further provides a method for charging by a power source adaptor for charging directly, the method including: upon connecting with an external AC input power source or detecting that a charging interface of the power source adaptor for charging directly is connected with the mobile terminal; starting, by the power source adaptor for charging directly, a wireless communication module of the power source adaptor for charging directly, and waiting for being connected wirelessly with the mobile terminal; and after they are connected successfully, exchanging data with the mobile terminal through the wireless communication module, and determining from current voltage of a battery of the mobile terminal a value of charging voltage output by the power source adaptor for charging directly.

Further to the mobile terminal, an embodiment of the application provides a method for charging a mobile terminal, the method including: detecting, by the mobile terminal, an external device being inserted into a USB interface of the mobile terminal; starting a wireless communication module of the mobile terminal, and searching through the wireless communication module for devices which can communicate wirelessly with the mobile terminal; if the found devices comprise the external device connected with the USB interface, then determining that the external device is a power source adaptor for charging directly, and connecting wirelessly therewith; if they are connected successfully, then exchanging, by the mobile terminal, data with the power source adaptor for charging directly through the wireless communication module; and detecting, by the mobile terminal, voltage of a battery of the mobile terminal, and if the voltage of the battery lies in a range delimited by preset direct charging thresholds, then transmitting directly charging voltage output by the power source adaptor for charging directly to the battery to charge the battery directly, and determining a value of the charging voltage output by the power source adaptor for charging directly from the current voltage of the battery.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In the application, a mobile terminal in which a chargeable battery is built can identify automatically and accurately the type of a currently inserted external device to thereby invoke different charging management modes according to different charging characteristics of different types of external devices so as to make reasonable use of charging resources, and the application proposes a charging method for three types of external devices including a host, a normal power source adaptor, and a power source adaptor for charging directly. In this method, firstly a communication mode of the power source adaptor for charging directly is configured so that the power source adaptor for charging directly can preferably wirelessly exchange data with a mobile terminal to be charged; and then a detection mechanism is designed dependent upon configured interface pins of the host and the normal power source adaptor currently charging through a USB data line so that the mobile terminal can identify automatically the three types of external devices including the host, the normal power source adaptor, and the power source adaptor for charging directly.

Firstly hardware configurations of the mobile terminal and the power source adaptor for charging directly will be described below.

Figure 1:
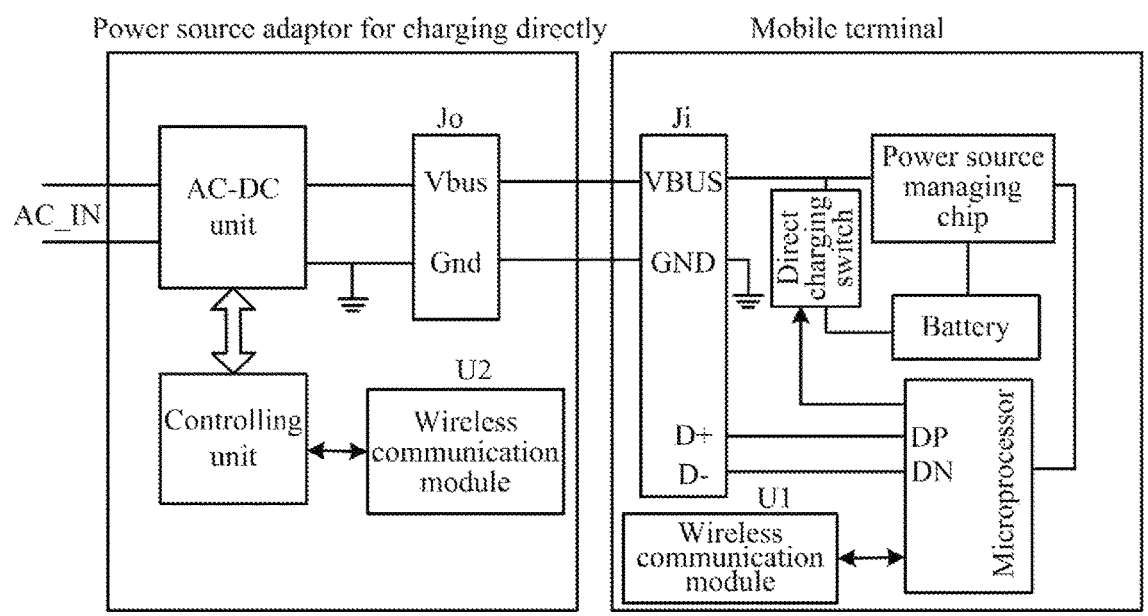
FIG. 1 is a circuit scheme block diagram of an embodiment of a mobile terminal and a power source adaptor for charging directly according to this application.

As illustrated in FIG. 1, in order to maintain the existing traditional charging function of the mobile terminal so that the mobile terminal can be normally engaged with and charged by the existing host and the normal power source adaptor, the existing charging interface of the mobile terminal which can be charged by the power source adaptor for charging directly according to this embodiment can be maintained, that is, a reused interface for both charging and transmitting data can be maintained, e.g., a currently widely applied USB interface Ji, so that the mobile terminal can be engaged with and powered by the normal power source adaptor and the computer host in the market, which are currently manufactured by the majority of the manufactures. For the power pin VBUS in the USB interface Ji, in this embodiment, one branch thereof is connected with a power source managing chip in the mobile terminal, and another branch thereof is connected with the battery through a direct charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with system ground of the mobile terminal so that the mobile terminal can be grounded together with the external charging device if the mobile terminal is engaged with the external device. For differential data pins D+ and D− in the USB interface Ji, they are connected with differential data interfaces DP and DN of the microprocessor for communication with the externally connected host.

A wireless communication module U1, e.g., a Bluetooth module, a WiFi module, etc., is designed in the mobile terminal to be connected with the microprocessor, possibly with a branch of UART interfaces of the microprocessor, to transmit data over a serial asynchronous bus. The mobile terminal can communicate wirelessly with the power source adaptor for charging directly supporting wireless communication through the wireless communication module U1 to thereby dynamically adjust charging voltage output by the power source adaptor for charging directly.

Figure 3:
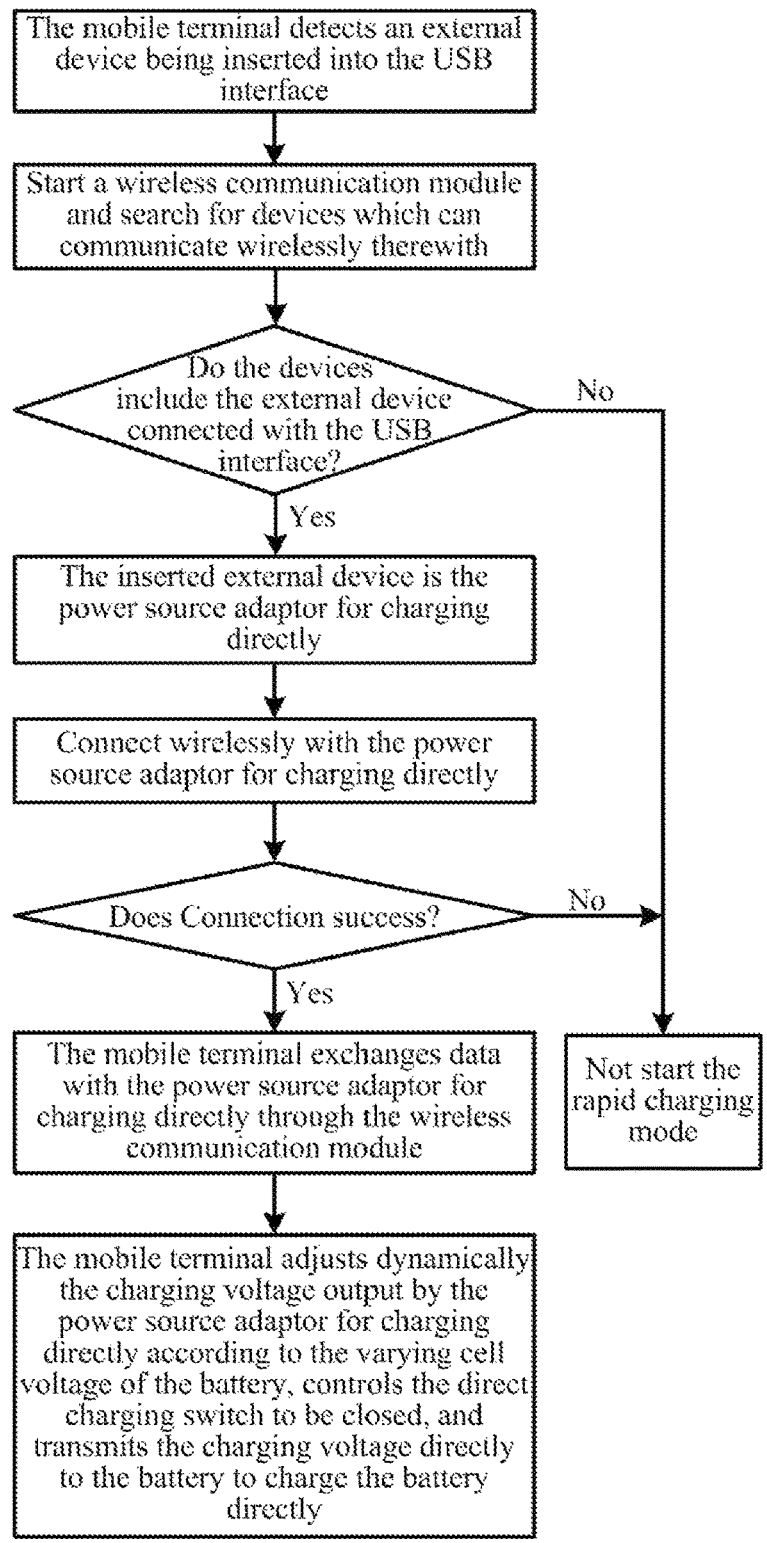
FIG. 3 is a flow chart of a process of an embodiment of a charging method according to the application.

As illustrated in FIG. 3, the mobile terminal detecting an external device being inserted into the USB interface Ji thereof starts the wireless communication module U1 to search for devices which can communicate wirelessly therewith, and determines whether the found devices include the external device connected with the USB interface Ji, and if so, then the mobile terminal determines that the external device is the power source adaptor for charging directly. At this time, the microprocessor is connected wirelessly with the power source adaptor for charging directly through the wireless communication module U1; and if they are connected successfully, then the microprocessor exchanges data with the power source adaptor for charging directly through the wireless communication module U1, and adjusts dynamically the charging voltage output by the power source adaptor for charging directly. That is, the mobile terminal detects voltage of a battery therein, and if the voltage of the battery lies in a range delimited by preset direct charging thresholds, then the mobile terminal determines a target charging voltage value from the current voltage of the battery, and adjusts the power source adaptor for charging directly to output the target charging voltage. The target charging voltage output by the power source adaptor for charging directly is transmitted directly to the battery to charge the battery directly to thereby speed up charging of the battery.

Figure 2:
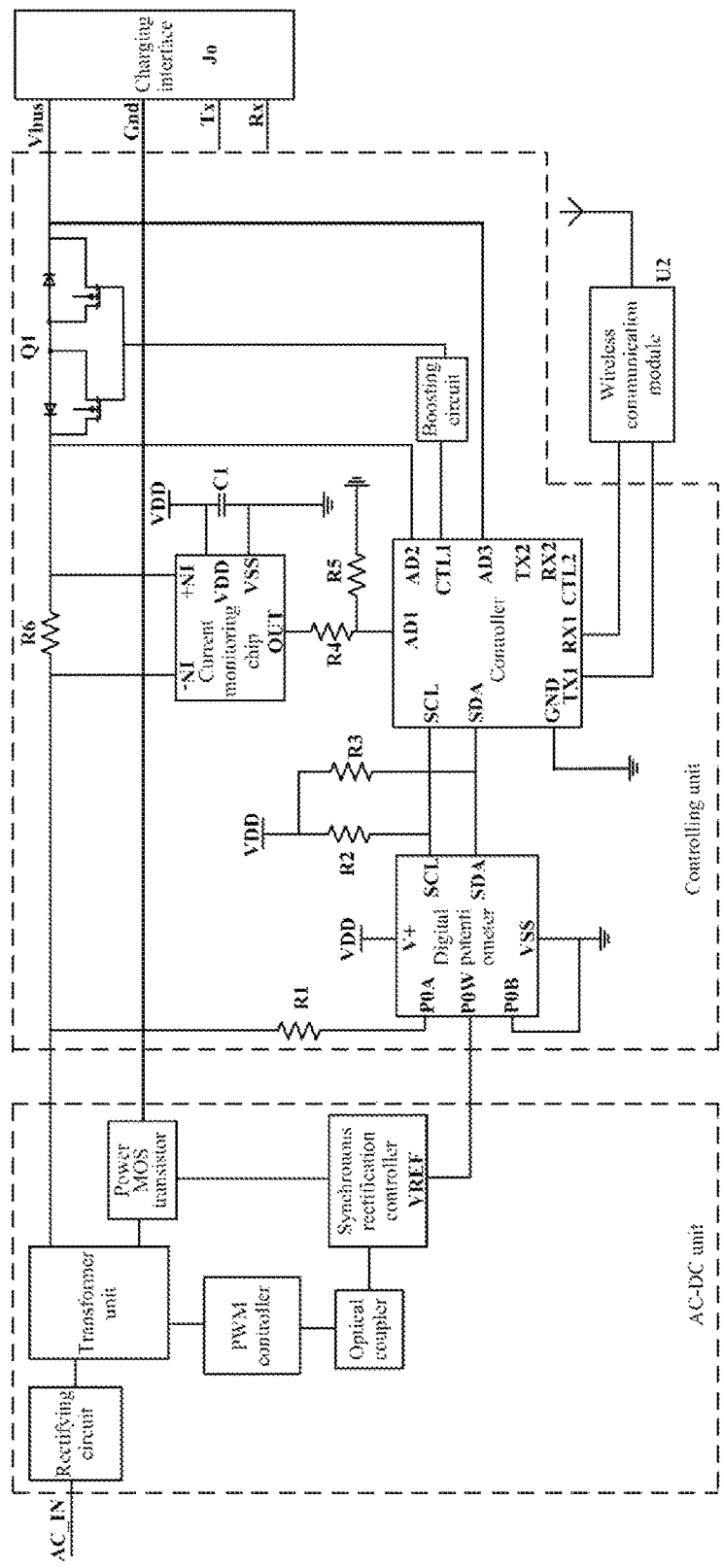
FIG. 2 is a circuit scheme diagram of an embodiment of the power source adaptor for charging directly in FIG. 1.

FIG. 2 illustrates a schematic diagram of circuitry components in the power source adaptor for charging directly supporting wireless communication in FIG. 1, where generally includes a charging interface Jo, a wireless communication module U2, a controlling unit, and an AC to DC converting unit (an AC-DC unit), as illustrated in FIG. 1 as well, where a power source pin Vbus and a ground pin Gnd are arranged in the charging interface Jo. The power source pin Vbus configured to transmit a charging power source is connected with the AC-DC unit to transmit a DC power source output by the AC-DC unit to the power source pin VBUS of the USB interface Ji of the mobile terminal to charge the mobile terminal. The ground pin Gnd is connected with the system ground of the power source adaptor for charging directly, and after the power source adaptor for charging directly is engaged with the mobile terminal, the ground pin Gnd is connected with the ground pin GND of the USB interface Ji of the mobile terminal so that both of the ground pins are grounded together. In order to enable the charging interface Jo to match and be engaged with the USB interface Ji of the mobile terminal, two configuration pins Tx and Rx configured to be connected with the respective differential data pins D+ and D− in the USB interface Ji can be further configured in the charging interface Jo. The two configuration pins Tx and Rx can be designed to be shorted, or can be designed to be disconnected, where the two disconnected configuration pins Tx and Rx can float. For the two different configuration states, different strategies to identify the type of the external device will be designed at the mobile terminal side as described later.

In this embodiment, a rectifying circuit, a transformer unit, a synchronous rectification controller, a PWM controller, an optical coupler, a power MOS transistor, and other elements are designed in the AC-DC unit; and a controller, a digital potentiometer, a current monitoring chip, a boosting circuit, and other elements are designed in the controlling unit, as illustrated in FIG. 2, where the rectifying circuit receives an AC input power source AC_IN provided by a mains grid, rectifies the AC input power source into a DC power source, and outputs the DC power source to the transformer unit for transformation into the charging voltage to charge the mobile terminal. The controller has the UART interfaces TX1 and RX1 thereof connected with the wireless communication module U2 for wireless communication with the microprocessor in the mobile terminal to exchange a handshake instruction, and receives control information sent by the mobile terminal, upon the successful handshake to adjust dynamically the volt value of the charging voltage output by the AC-DC unit based on the varying voltage of the battery in the mobile terminal to thereby charge directly the battery built in the mobile terminal at large current.

The wireless communication module U2 can be embodied as a Bluetooth module, a WiFi module, etc., and the power source adaptor for charging directly can exchange data with the mobile terminal in the wireless communication mode, so that such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

In order to adjust the output voltage of the AC-DC unit, in this embodiment, the digital potentiometer is designed in the controlling unit to be connected with the controller. The controller generates a voltage adjusting instruction based on the received control information, and sends the voltage adjusting instruction to the digital potentiometer to change the resistance value of a valid resistor of the digital potentiometer. In this embodiment, the controller can be connected and communicate with the digital potentiometer preferably over an I²C bus, as illustrated in FIG. 2, to transmit the voltage adjusting instruction. In order to ensure the stability of the signal being transmitted, in this embodiment, a voltage pull-up circuit is further connected over the I²C bus, for example, a clock line SCL and a data line SDA of the I²C bus are connected with a DC power source VDD respectively through pull-up resistors R2 and R3 to thereby improve the anti-interference capability of the signal being transmitted.

The DC power source VDD can be embodied as a set of small electromagnetic coils designed separately in the transformer unit. The turn ratio of a primary coil and a secondary coil in the set of small electromagnetic coils is configured to transform the voltage of the DC power source output by the rectifying circuit into the desirable DC power source VDD to supply power to those components needing DC operating voltage in the power source adaptor for charging directly, e.g., the controller, the digital potentiometer, the current detecting chip, and other components to thereby enable them to operate as desired.

The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer unit and the ground. One end P0A of the resistor body can be connected with the anode of the secondary coil in the other set of electromagnetic coils through the current-limiting resistor R1 connected in series, and the other end P0B of the resistor body can be grounded. A central tap P0W of the resistor body is connected with a reference voltage pin VREF of the synchronous rectification controller, and if the resistance value of the valid resistor of the digital potentiometer varies, then the volt value of the charging voltage output by the other set of electromagnetic coils in the transformer unit will be adjusted in order to maintain the reference voltage on the reference voltage pin VREF of the synchronous rectification controller. In order to adjust the volt value of the charging voltage, the synchronous rectification controller adjusts its output control signal according to the varying resistance value of the valid resistor of the digital potentiometer, and transmits the control signal to the PWM controller after the control signal is optic-electrically isolated by the optical coupler, to thereby adjust a duty ratio of a PWM signal output by the PWM controller. Particularly the PWM signal is transmitted to the transformer unit, and particularly can be transmitted to a switch transistor connected in series with the secondary coil in the other set of electromagnetic coils, to control the switch transistor to be switched on and off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer unit can be finely adjusted in the range of 3.6V to 12V to thereby charge different mobile terminals as required in reality.

In order to achieve the stability of the charging voltage output by the transformer unit, in this embodiment, instead of a traditional rectification scheme in which a diode is connected in series on a charging voltage transmission line, the power MOS transistor is connected on the charging voltage transmission line and switched on or off by the switching signal output by the synchronous rectification controller to thereby shape the waveform of the charging voltage output by the transformer unit.

In this embodiment, the power MOS transistor is preferably embodied as an NMOS transistor connected between the cathode of the secondary coil in the other set of electromagnetic coils and the ground pin Gnd of the charging interface Jo. Since the power source adaptor for charging directly supports an output of large current, if the charging voltage output by the transformer unit is shaped by the diode, then power consumption of the power source adaptor for charging directly may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the power source adaptor for charging directly can be lowered effectively and the efficiency in charging the mobile terminal can be improved.

In order to monitor in real time charging current output by the transformer unit to thereby improve the safety in charging, in this embodiment, a current monitoring unit is further arranged in the power source adaptor for charging directly to monitor in real time charging current $I_{chg}$ output via the charging interface Jo, and to feed the charging current back to the controller. From the received magnitude of the charging current, the controller can both determine whether the charging interface Jo is connected with the mobile terminal (if not, then the charging current output via the charging interface Jo will be zero), and take a necessary protection measure, for example, disconnect the charging current from being output, to thereby protect the power source adaptor for charging directly and the mobile terminal, upon detecting abnormality of the charging current.

The current monitoring unit can further include a sample resistor R6 and a current monitoring chip as illustrated in FIG. 2. The sampling resistor R6 is connected in series in a transmission line of the charging current, and preferably between the anode of the secondary coil in the other set of electromagnetic coils in the transformer unit and the power source pin Vbus of the charging interface Jo. Inputs −IN and +IN of the current monitoring chip are connected with two ends of the sampling resistor R6 to acquire a voltage drop across the sampling resistor R6, and after the voltage drop is amplified, the magnitude of the charging current is calculated from the voltage drop and the resistance value of the sampling resistor R6. The current monitoring chip generates sample voltage corresponding to the calculated magnitude of the charging current according to the calculated magnitude of the charging current, and transmits the sample voltage to an ADC interface AD1 of the controller through an output OUT thereof, and the sample voltage is analog-to-digital converted by the controller into the magnitude of the charging current, so the controller can monitor in real time the charging current.

If the range of the amplitude of the sample voltage output by the current monitoring chip exceeds an interface voltage range specified by the ADC interface AD1 of the controller, then the ADC interface of the controller may be damaged. In order to protect the controller, an bleeder circuit can be additionally arranged between the output OUT of the current monitoring chip and the ADC interface AD1 of the controller, e.g., a resistor bleeder circuit composed of resistors R4 and R5, to adjust the voltage signal output by the current monitoring chip within the interface voltage range acceptable to the AD1 interface of the controller so as to avoid the ADC interface AD1 of the controller from being damaged due to the input voltage being too high.

In order to improve the safety in charging so that the power source adaptor for charging directly can have the charging power source disconnected rapidly upon abnormal charging occurring to thereby avoid the mobile terminal from being damaged, in this embodiment, a switch transistor Q1 supporting large current passing is further arranged in the charging power source transmission line of the power source adaptor for charging directly so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor is preferably embodied as a pair of NMOS transistors Q1 in which parasitic diodes connected in anti-parallel are built, as illustrated in FIG. 2. The pair of NMOS transistors Q1 are switched on and connected in series in the transmission line of the charging power source, where the source electrodes of the two NMOS transistors in the pair of NMOS transistors Q1 can be connected, the drain electrodes of the two NMOS transistors can be connected respectively with the anode of the secondary coil in the other set of electromagnetic coils in the transformer unit, and the power source pin Vbus of the charging interface Jo; and then the gate electrodes of the two NMOS transistors can be connected with the boosting circuit. An enable terminal of the boosting circuit is connected with the controller to receive an enable signal output by the controller. During charging, if the controller detects normal charging current, then the controller will output the valid enable signal to control the boosting circuit to be enabled into operation to boost the DC power source output by the transformer unit to the switch voltage higher than the volt value of the charging voltage, and the switch voltage is output to the gate electrodes of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller will output the invalid enable signal to control the boosting circuit to stop operating. At this time the pair of NMOS transistors Q1 is switched off due to the disappearing voltage at the gate electrodes thereof, to thereby have the transmission line of the charging power source disconnected to block the charging power source from outputting to the outside, so that the power source adaptor for charging directly can be controlled to stop supplying power to the mobile terminal.

A charging method operating on the mobile terminal and the power source adaptor for charging directly will be described below with reference to the hardware configurations illustrated in FIG. 1 and FIG. 2.

Figure 4:
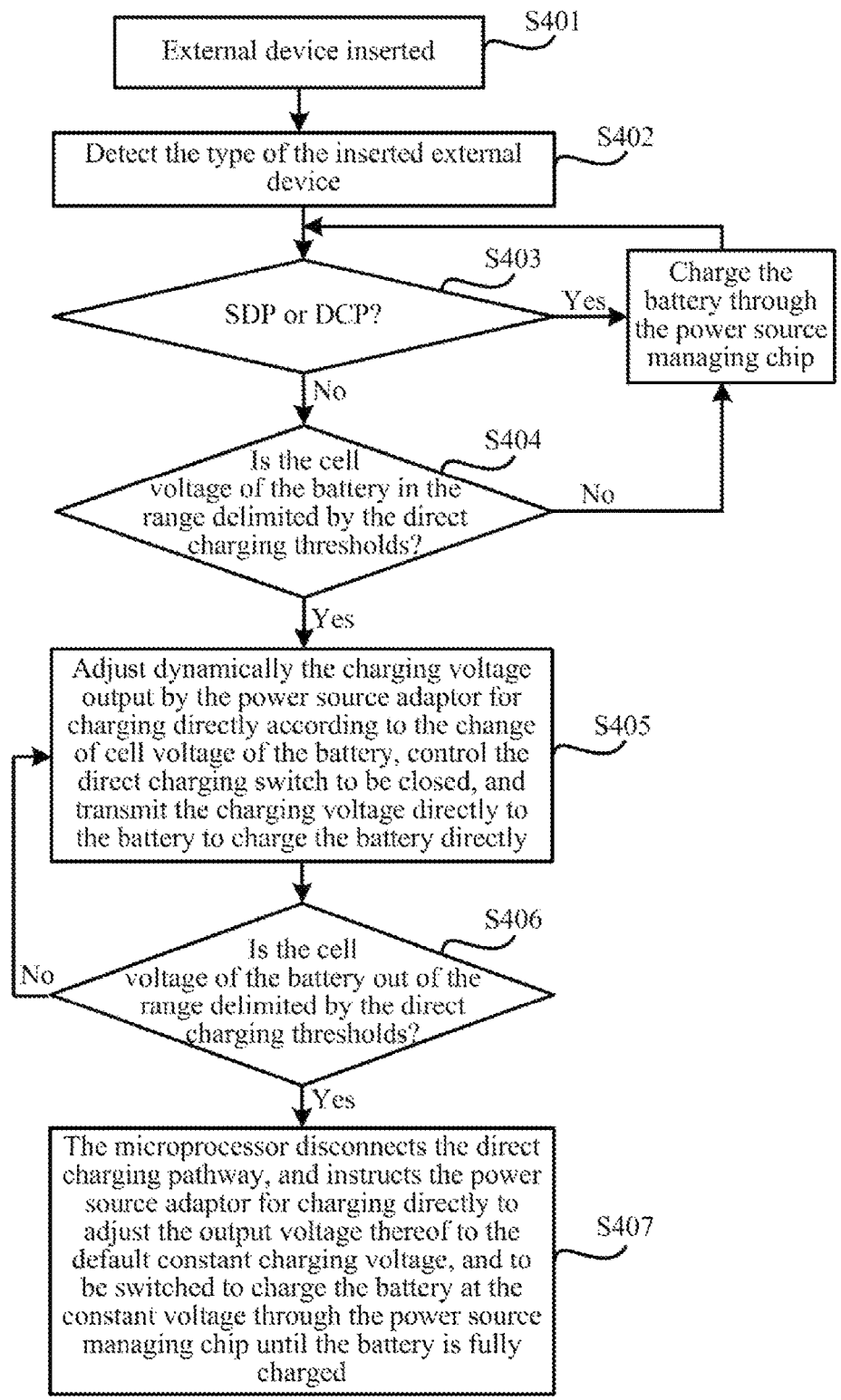
FIG. 4 is a flow chart of a particular process of an embodiment of a charging method according to the application.

As illustrates in FIG. 4, the charging method generally involves the following steps:

S401. The mobile terminal detects whether an external device is inserted, and performs subsequent steps upon detecting an external device being inserted.

In this embodiment, whether an external device being inserted can be detected as in the prior art, for example, by detecting whether a DC power source accessing the power source pin VBUS of the USB interface Ji of the mobile terminal. In the traditional host charging mode SDP and normal power source adaptor charging mode DCP, the charging voltage output by the host and the normal power source adaptor is typically 5V; and the power source adaptor for charging directly can be configured to output by default the same constant charging voltage as the host and the normal power source adaptor, e.g., 5V constant charging voltage so that the mobile terminal can substantially determine whether the power source adaptor for charging directly is inserted.

Of course the 5V constant charging voltage here only relates to an embodiment, and for some mobile terminal to be charged at constant voltage of another volt value, the power source adaptor for charging directly will be simply configured to output by default the same constant charging voltage as the charging voltage output by the normal power source adaptor when the normal power source adaptor supplies power to the mobile terminal.

S402. The mobile terminal detects the type of the inserted external device.

In this embodiment, the mobile terminal operates by default without being charged directly, that is, the microprocessor in the mobile terminal controls by default the direct charging switch to be opened to have the power source pin VBUS of the USB interface Ji connected with the power source managing chip.

Whether the inserted external device is the host or the normal power source adaptor can be determined as in the existing BC1.2 charging type detection scheme. Of course this can alternatively be determined particularly as follows:

(1) If the two configuration pins Tx and Rx in the charging interface Jo of the power source adaptor for charging directly are disconnected from each other, then:

If the mobile terminal detects an external device being inserted into the charging interface thereof, then the microprocessor firstly determines whether the differential data pins D+ and D− thereof are shorted, and if so, then the mobile terminal determines that the inserted external device is the normal power source adaptor because the communication pins of the existing normal power source adaptor typically are configured to be shorted; otherwise, the mobile terminal communicates with the external device by USB through the microprocessor, and if the communication succeeds, then the mobile terminal determines that the inserted external device is the host because the existing host (particularly the computer host) typically is connected and communicates with and supplies power to the mobile terminal through the USB data line; otherwise, the inserted external device may be the power source adaptor for charging directly.

In order to determine whether the inserted external device is the power source adaptor for charging directly, the microprocessor firstly starts the wireless communication module U1 to search for devices which can communicate wirelessly therewith, and if the found devices include the external device connected with the USB interface Ji of the mobile terminal, then the microprocessor determines that the external device is the power source adaptor for charging directly. Then the microprocessor communicates wirelessly with the power source adaptor for charging directly through the wireless communication module U1, and if the communication succeeds, then the mobile terminal enters the charging mode; otherwise, the microprocessor will not start the charging mode or can further output an alert of "Inserted Device Cannot Be Identified".

(2) If the two configuration pins Tx and Rx in the charging interface Jo of the power source adaptor for charging directly are shorted, then:

If the mobile terminal detects an external device being inserted into the charging interface thereof, then the microprocessor firstly determines whether the differential data pins D+ and D− thereof are shorted, and if not, then the microprocessor determines that the inserted external device is the host; otherwise, the microprocessor determines that the inserted external device is a power source adaptor. In order to determine the particular type of the inserted power source device, the microprocessor starts the wireless communication module U1 to search for devices which can communicate wirelessly therewith, and if the found devices include the external device connected with the USB interface Ji of the mobile terminal, then the microprocessor determines that the external device is the power source adaptor for charging directly; otherwise, the microprocessor determines that the inserted device is the normal power source adaptor.

If it is determined that the external device inserted into the USB interface Ji of the mobile terminal is the power source adaptor for charging directly, then the microprocessor communicates wirelessly with the power source adaptor for charging directly through the wireless communication module U1, and if the communication succeeds, then the mobile terminal enters the charging mode; otherwise, the microprocessor will not start the charging mode.

In a preferred implementation of this embodiment, preferably the mobile terminal communicates wirelessly with the power source adaptor for charging directly in a Bluetooth mode, that is, the wireless communication modules U1 and U2 are embodied as Bluetooth modules so that the mobile terminal exchanges data with the power source adaptor for charging directly in the following process:

After there is a detected external device inserted into the USB interface Ji of the mobile terminal, if the mobile terminal needs to further determine whether the inserted external device is the power source adaptor for charging directly, then the microprocessor starts the Bluetooth module to search for external Bluetooth devices. In order to enable the power source adaptor for charging directly to be found by the mobile terminal, the Bluetooth module U2 in the power source adaptor for charging directly is designed to run automatically on power-on after the power source adaptor for charging directly is connected with an external AC input power source or the mobile terminal is connected with the charging interface Jo. Particularly the controlling unit in the power source adaptor for charging directly can be designed to be powered on and run directly after the power source adaptor for charging directly is connected with the AC input power source. After the controlling unit becomes stable in operation, the controlling unit starts automatically the Bluetooth module U connected therewith, or after the controlling unit detects that the external mobile device is connected with the charging interface Jo of the power source adaptor, the controlling unit controls the Bluetooth module U2 connected therewith to be started and to wait for being paired and connected with the external mobile terminal.

There may be a number of different types of Bluetooth devices, e.g., a Bluetooth earphone, a Bluetooth sound box, a Bluetooth enabled cell phone, a power source adaptor for charging directly supporting Bluetooth communication, etc., nearby the mobile terminal. During the course of searching for the external Bluetooth devices, the mobile terminal creates a list of devices including the found Bluetooth devices, and provides the list of devices to the user for selecting one of the Bluetooth devices to be paired. If the user selects the name of a device corresponding to the power source adaptor for charging directly connected with the mobile terminal, then the microprocessor in the mobile terminal sends a Bluetooth match code (or a Bluetooth PIN code) through the Bluetooth module U1 to request for matching with the power source adaptor for charging directly.

The power source adaptor for charging directly connected with the mobile terminal feeds the same Bluetooth match code back to the mobile terminal upon reception of the Bluetooth match code.

If the mobile terminal detects the same Bluetooth match code input by the power source adaptor for charging directly, which indicates successful matching, then the mobile terminal waits for a next connection operation; and if the power source adaptor for charging directly inputs a different Bluetooth match code, which indicates that this matching fails, then they cannot be connected. This operation of matching the mobile terminal with the power source adaptor for charging directly can be considered as authentication between these two devices.

After the devices are matched successfully, the mobile terminal initiates a connection request on its own initiative to the power source adaptor for charging directly for being wirelessly connected with the power source adaptor for charging directly.

The power source adaptor for charging directly accepts the connection request of the mobile terminal, and after the mobile terminal and the power source adaptor for charging directly are connected successfully, they conduct Bluetooth communication to exchange with each other a control instruction, and respective parameters required for charging.

Figure 5:
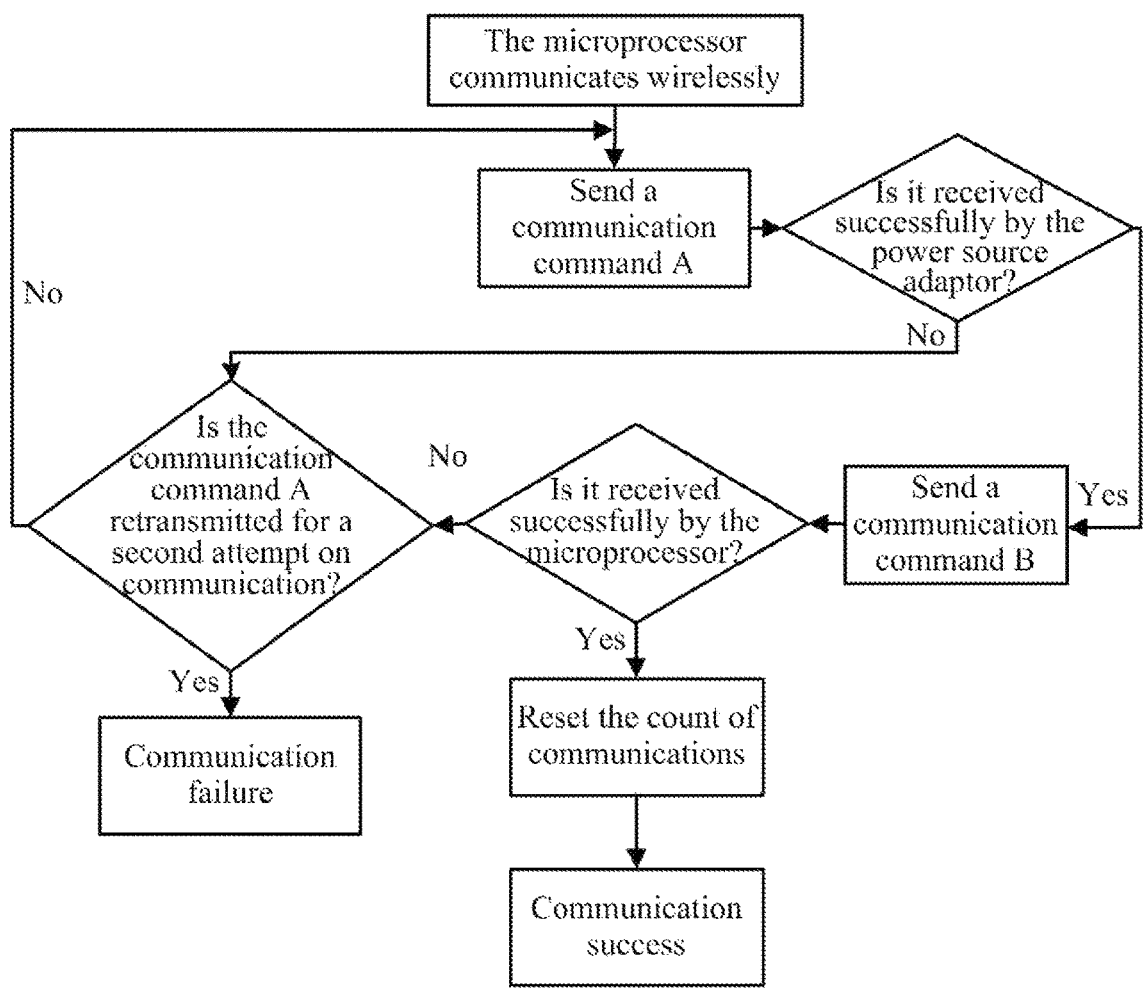
FIG. 5 is a flow chart of an embodiment of detecting communication between the mobile terminal and the power source adaptor for charging directly illustrated in FIG. 1.
Figure 6:
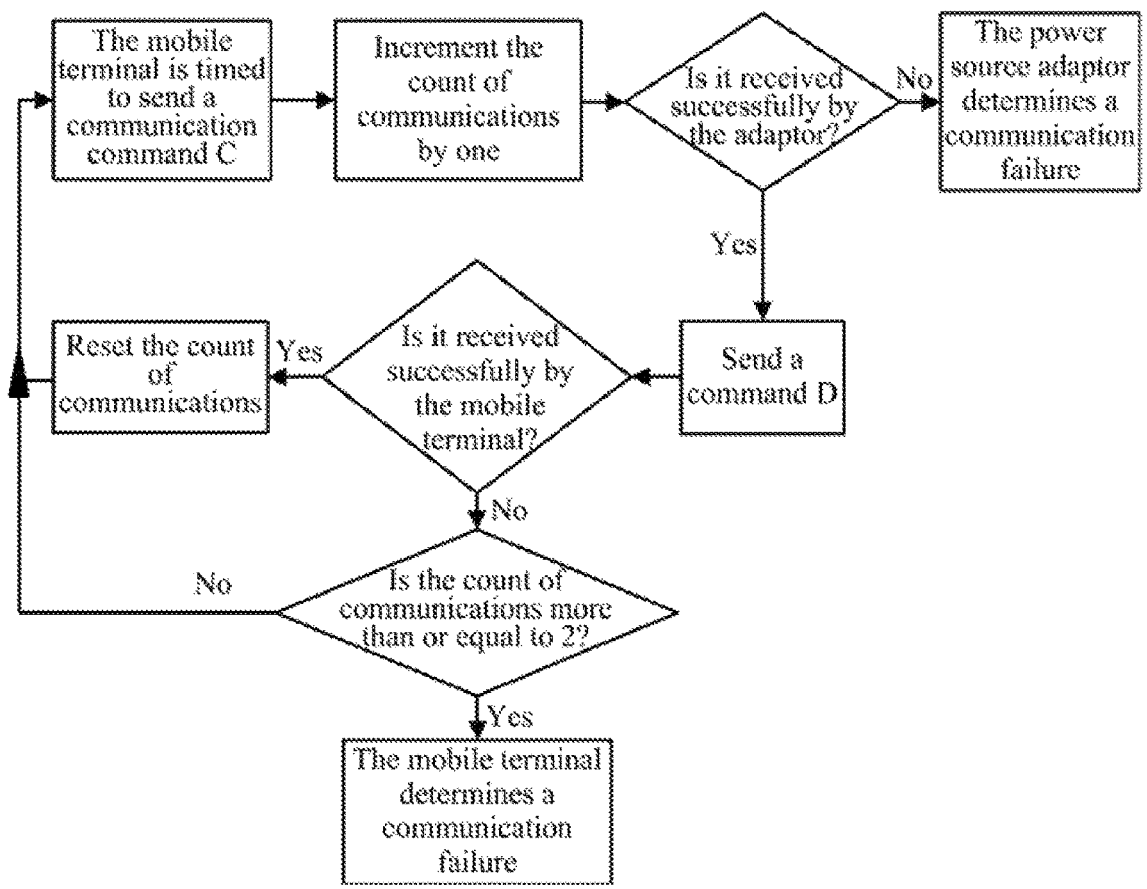
FIG. 6 is a flow chart of an embodiment of a timed detection mechanism of communication between the mobile terminal and the power source adaptor for charging directly illustrated in FIG. 1.

During wireless communication between the microprocessor and the power source adaptor, in order to achieve a better switching mechanism and error-tolerant mechanism, in this embodiment, communication between the mobile terminal and the power source adaptor for charging directly can be detected preferably in the following flow as illustrated in FIG. 5: the microprocessor initiates a communication command A on its own initiative to the external power source adaptor after starting the wireless communication module U1, and also counts the number of communications. The power source adaptor for charging directly receiving successfully the communication command A can respond accordingly by sending a communication command B to the mobile terminal, and if the mobile terminal does not receive any valid communication command B, then the microprocessor firstly determines the count of communications at that time, and if the count of communications is less than 2, then the microprocessor retransmits the communication command A for a second attempt on communication; and if the count of communications is more than or equal to 2, then the microprocessor determines that the communication fails. If the mobile terminal receives successfully the communication command B, then the microprocessor determines that the communication succeeds, and resets the count of communications, and thereafter starts a timed communication detecting mechanism as illustrated in FIG. 6.

In the timed communication detecting mechanism, the mobile terminal is timed to send a handshake instruction, e.g., a communication instruction C, to the power source adaptor for charging directly, and also increments the count of communications by one; and if the power source adaptor for charging directly receives successfully the communication instruction C, then it feeds immediately a response instruction back to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the power source adaptor for charging directly; and if both of the communications fail, then the mobile terminal determines that the power source adaptor for charging directly engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S403. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the inserted external device is the host) or the standard DCP charging mode (if the inserted external device is the normal power source adaptor).

The microprocessor controls the direct charging switch to be kept in the default Off state, and also starts the power source managing chip to receive the charging voltage input by the host or the normal power source adaptor, and to enter different charging phases according to current cell voltage of the battery. By way of an example, for a 4.2V chargeable battery (4.2V cell voltage of the battery being fully charged), if the cell voltage is less than 3.5V, then the power source managing chip enters a small-current pre-charging phase in which 500 mA charging current is output, and the battery is pre-charged at the small current. If the cell voltage of the battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the cell voltage of the battery to rise from 3.5V to 4.1V. If the cell voltage of the battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the power source adaptor for charging directly, then the mobile terminal operates in a subsequent rapid charging mode.

S404. The mobile terminal determines whether the cell voltage of the battery lies in a range delimited by direct charging thresholds, and if so, then the mobile terminal performs a subsequent large-current direct charging process; otherwise, the battery is charged by the source power source managing chip.

In this embodiment, the direct charging thresholds (a lower voltage threshold S1 and an upper voltage threshold S2) can be determined particularly dependent upon the real condition of the battery to preferably agree with the voltage range of the battery corresponding to the constant-current charging phase in the normal DCP charging mode. For example, the lower voltage threshold S1 and the upper voltage threshold S2 of the 4.2V chargeable battery above can be set to S1=3.5V and S2=4.1V. If the cell voltage $V_{bat\_real}$ of the battery is $V_{bat\_real}$<3.5V or $V_{bat\_real}$>4.1V, then the microprocessor controls the direct charging switch to be kept in the default Off state, and also starts the power source managing chip to receive the constant charging voltage input by the power source adaptor for charging directly, e.g., DC 5V charging voltage, to pre-charge the battery at small current (for $V_{bat\_real}$<3.5V) or at constant voltage (for $V_{bat\_real}$>4.1V), that is, the battery is charged in the same charging mode as the host and the normal power source adaptor. If the cell voltage $V_{bat\_real}$ of the battery is detected in the range [3.5V, 4.1V] delimited by the direct charging thresholds, then the mobile terminal enters the subsequent direct charging process.

S405. The mobile terminal communicates wirelessly with the power source adaptor for charging directly, adjusts dynamically the charging voltage output by the power source adaptor for charging directly according to the change of cell voltage of the battery, and controls the direct charging switch to be closed to short the power source managing chip so that the power source managing chip stops operating, and the charging voltage is transmitted directly to the battery to charge the battery directly.

In this embodiment, the charging voltage can be adjusted dynamically in any one of the following three preferred designed approaches:

In a first designed approach, a reference table of relationship between the cell voltage of the battery and the target charging voltage is preset in the mobile terminal, the cell voltage of the battery is detected, and the reference table is searched using the cell voltage for the target charging voltage corresponding to the cell voltage to control the voltage output of the power source adaptor for charging directly.

The cell voltage of the battery can be divided into several intervals according to the range [S1, S2] delimited by the preset direct charging thresholds, for example, the cell voltage is divided into N intervals at a step of 100 mV, where N=(S2−S1)/100 mV. For each interval, a target charging voltage value $V_{out}$, a target charging current value $I_{targ}$, and a charging current maximum value $I_{max}$ corresponding to the cell voltage in the interval are predetermined to create a reference table, and the reference table is stored in the microprocessor, or in a memory in the mobile terminal, connected with the microprocessor for being invoked by the microprocessor.

Figure 7:
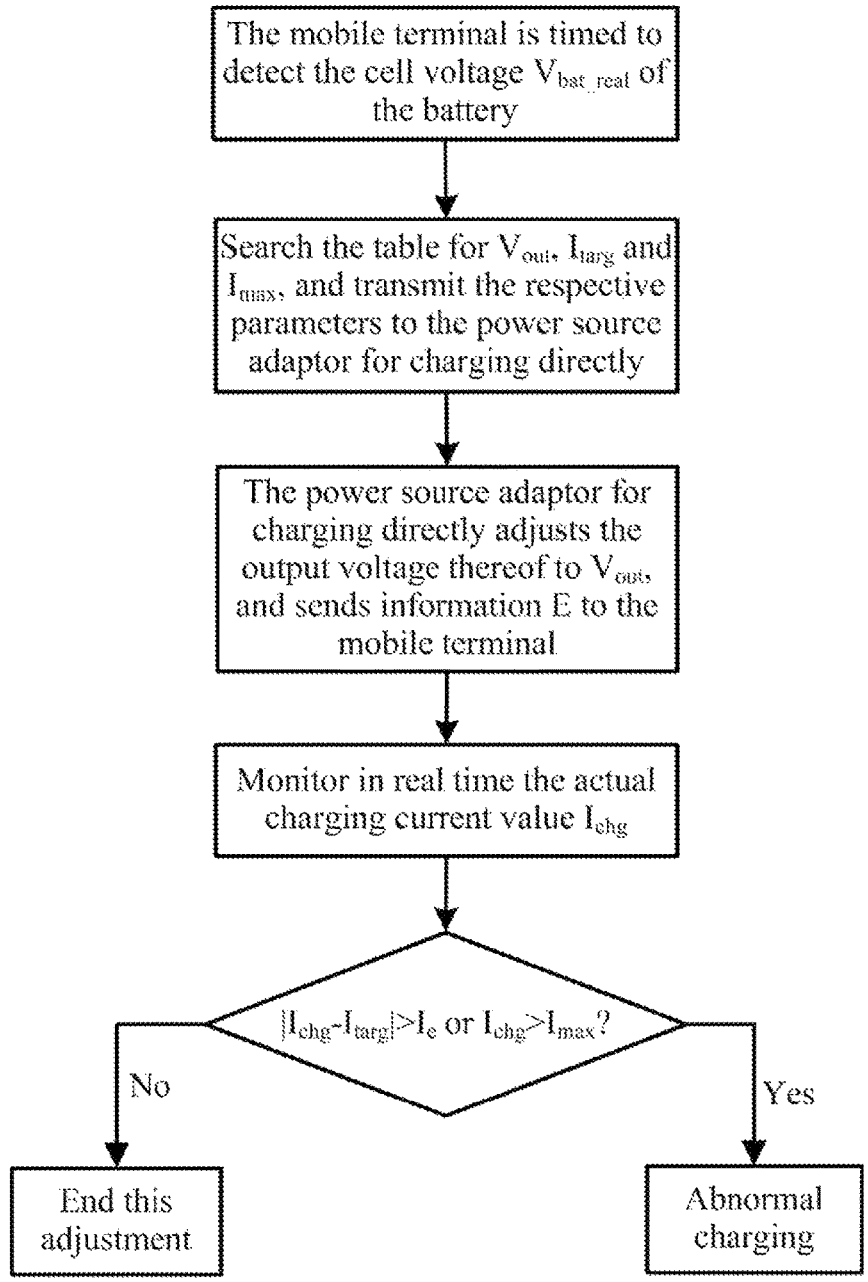
FIG. 7 is a flow chart of control in an embodiment of a direct charging control strategy using a lookup table.

After entering the direct charging process, as illustrated in FIG. 7, the microprocessor is timed to detect the cell voltage $V_{bat\_real}$ of the battery, searches the reference table using the detected cell voltage $V_{bat\_real}$, determines the cell voltage interval in which the cell voltage $V_{bat\_real}$ lies, and then searches using the determined interval for the target charging voltage value $V_{out}$, the target charging current value $I_{targ}$, and the charging current maximum value $I_{max}$ corresponding to the interval. Thereafter the microprocessor communicates wirelessly with the power source adaptor for charging directly, and sends the target charging voltage value $V_{out}$, the target charging current value $I_{targ}$, and the charging current maximum value $I_{max}$ to the power source adaptor for charging directly.

At the power source adaptor for charging directly side, the power source adaptor for charging directly adjusts the resistance value of the valid resistor of the digital potentiometer thereof according to the received target charging voltage value $V_{out}$ to thereby change the charging voltage output by the AC-DC unit thereof to the target charging voltage value $V_{out}$. At the end of the adjusting, the power source adaptor for charging directly sends information E to the mobile terminal, monitors in real time the actual charging current $I_{chg}$ output by the AC-DC unit, through the current monitoring chip, and if $|I_{chg}-I_{targ}|>I_e$ ($I_e$ represents a controllable range of the difference between the actual charging current value of the power source adaptor for charging directly and the target charging current value, and can be preferably set to $I_e$=500 mA in this embodiment), or $I_{chg}>I_{max}$, then the power source adaptor for charging directly determines abnormal charging. At this time in order to ensure the safety in charging, the power source adaptor for charging directly outputs the invalid enable signal through the controller therein, as illustrated in FIG. 2, to control the boosting circuit to stop the switch voltage from being output, and to further control the pair of MNOS transistors Q1 to be switched off to thereby block the charging power source output by the AC-DC unit from being transmitted to the mobile terminal. If $|I_{chg}-I_{targ}|\leq I_e$ and $I_{chg}\leq I_{max}$, then the power source adaptor for charging directly ends this adjusting process, and charges directly at large current the battery in the mobile terminal using the adjusted charging voltage, where the charging current here can rise beyond 3500 mA, to thereby significantly speed up charging.

The following preferred scheme to create the reference table is proposed in this embodiment:

A number i of intervals, denoted as $x_{i1}$~$x_{i2}$, are set for the cell voltage in the range of [S1, S2];

For each of the intervals [$x_{i1}$, $x_{i2}$], a target charging voltage value $V_{out}$, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat}, I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which preferably lies in the range of [150 mA, 250 mA]; and The reference table is created from the parameters $V_{bat\_real}$, $V_{out}$, $I_{targ}$ and $I_{max}$.

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a preferred designed scheme of this embodiment, the target charging voltage value $V_{out}$ and the charging current maximum value $I_{max}$ corresponding to each interval [$x_{i1}$, $x_{i2}$] can be calculated preferably as follows: a lower bound $x_{i1}$ of the cell voltage in the interval is used as $V_{bat\_real}$ and substituted into Equation (1) to calculate the target charging voltage value $V_{out}$ corresponding to the interval; an upper bound $x_{i2}$ of the cell voltage in the interval is used as $V_{bat\_real}$ and substituted into Equation (3) to calculate the charging current maximum value $I_{max}$ corresponding to the interval; and further the target charging current value $I_{targ}$ is derived from calculate ed $I_{max}$ in Equation (2), and the reference table is created.

By way of an example, still taking the 4.2V chargeable battery as an example, for the system powered by the battery, from the perspective of the safety of voltage to power the device, the terminal voltage $V_{bat}$ of the battery shall not be more than a specific $V_{bat\_max}$ dependent upon the platform, and less than the specified safe value $V_{bat\_safe}$ of the terminal voltage of the battery. If the safe value $V_{bat\_safe}$ of the terminal voltage of the battery is $V_{bat\_safe}$=4500 mV, then $V_{bat\_max}$=4470 mV can be taken, so the terminal voltage $V_{bat}$ of the battery is $V_{bat}=V_{bat\_real}+I_{chg}*R_{bat}\leq 4470$.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat},4000) \quad (5)$$

If the inner resistance $R_{bat}$ of the battery is $R_{bat}$=100 mΩ, the other impedance is $R_{line}+R_{board}$=100 mΩ, and the range delimited by the preset direct charging thresholds of the battery is [3500 mV, 4100 mV] at a step of 100 mV, then the range [3500 mV, 4100 mV] delimited by the direct charging thresholds can be divided into 6 intervals; an upper bound of the cell voltage in each interval is substituted into Equation (5) to calculate the charging current maximum value $I_{max}$; the target charging current value $I_{targ}$ is derived from calculated $I_{max}$ in Equation (2), and ΔI=200 mA is taken in this embodiment; and a lower bound of the cell voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the cell voltage of the battery, and the charging current and the charging voltage output by the adaptor, but there may be a minor error relative to the real correspondence relationship, so the battery can be experimentally charged, the charging voltage varying with different charging current is recorded, and the values of the parameters in the reference table are adjusted, for example, the values of the respective parameters in the reference table are adjusted to their ideal values by averaging them.

The target charging voltage obtained by looking up from the table is a theoretical value, and in reality, the inner resistance of the battery, and the impedance on the line may vary with temperature, aging, and other factors, so the real charging current value $I_{chg}$ output by the power source adaptor for charging directly may deviate to some extent from the target charging current value $I_{targ}$, thus resulting in some influence upon the charging speed. In order to raise the charging current as much as possible in an allowable range to further speed up charging, in this embodiment, a charging current self-adjusting algorithm is introduced at the power source adaptor for charging directly side, that is, after the power source adaptor for charging directly adjusts the output voltage to $V_{out}$, if $I_{targ}-I_e\leq I_{chg}<I_{targ}$, then $V_{out}=V_{out}+\Delta V$ is adjusted progressively so that the actual charging current value $I_{chg}$ output by the power source adaptor for charging directly approaches progressively the target charging current value $I_{targ}$.

In this embodiment, $V_{out}$ can be adjusted preferably for five times by an amount which can be estimated in Equation (1), and if $V_{bat\_real}$ and R (including the inner resistance of the battery, the line resistance, and all the other impedances) are invariable, then ΔV=ΔI*R. In this embodiment, ΔV is preferably set to ΔV=10 mV.

In a second designed approach, a reference table of relationship between the cell voltage of the battery and the target charging voltage is preset at the power source adaptor for charging directly side, and the power source adaptor for charging directly searches the reference table using the received cell voltage (detected and provided by the mobile terminal) for the target charging voltage value corresponding to the cell voltage. Thereafter the power source adaptor for charging directly adjusts the output voltage thereof to the target charging voltage value to charge directly the battery built in the mobile terminal at large current.

Reference can be made for the related description in the first designed approach above for details about creating the reference table.

Particularly after entering the direct charging process, at the mobile terminal side, the microprocessor is timed to detect the cell voltage $V_{bat\_real}$ of the battery, communicates wirelessly with the power source adaptor for charging directly, and is timed to send the detected cell voltage $V_{bat\_real}$ to the power source adaptor for charging directly.

At the power source adaptor for charging directly side, the power source adaptor for charging directly searches the stored reference table thereof using the received cell voltage $V_{bat\_real}$, determines the cell voltage interval in which the cell voltage $V_{bat\_real}$ lies, and then searches using the determined interval for the target charging voltage value $V_{out}$, the target charging current value $I_{targ}$, and the charging current maximum value $I_{max}$ corresponding to the interval. Then the controller adjusts the resistance value of the valid resistor of the digital potentiometer to thereby change the charging voltage output by the AC-DC unit thereof to the target charging voltage value $V_{out}$. At the end of the adjusting, the power source adaptor for charging directly sends information E to the mobile terminal, and sends $I_{targ}$ and $I_{max}$ to the mobile terminal for detection of abnormal charging. At the same time the power source adaptor for charging directly, monitors in real time the actual charging current value $I_{chg}$ output by the AC-DC unit, through the current monitoring chip thereof, and if $|I_{chg}-I_{targ}|>I_e$ or $I_{chg}>I_{max}$, then the power source adaptor for charging directly determines abnormal charging, disconnects the charging power source from being output, and stops the mobile terminal from being charged. If $|I_{chg}-I_{targ}|\leq I_e$ and $I_{chg}\leq I_{max}$, then the power source adaptor for charging directly ends this adjusting process.

Also the charging current self-adjusting algorithm described in the first designed approach above can be introduced at the power source adaptor for charging directly side so that the actual charging current value $I_{chg}$ output by the power source adaptor for charging directly can approach progressively the target charging current value $I_{targ}$ to thereby further speed up charging.

The table-lookup approach above relating to segmented constant-current-like charging can reduce the count of times that the output voltage of the power source adaptor for charging directly is adjusted, but the output voltage may be constant for a period of time, and the charging current will be decreasing gradually with the ever rising cell voltage of the battery, thus resulting in some influence upon the charging speed of the battery.

In order to enable the charging current to be maintained at a stable high level, direct charging control by following in real time the varying cell voltage is proposed in this embodiment as described in the following third designed approach.

In the third designed approach, the target charging voltage value is adjusted in real time by following dynamically the varying cell voltage of the battery core.

Figure 8:
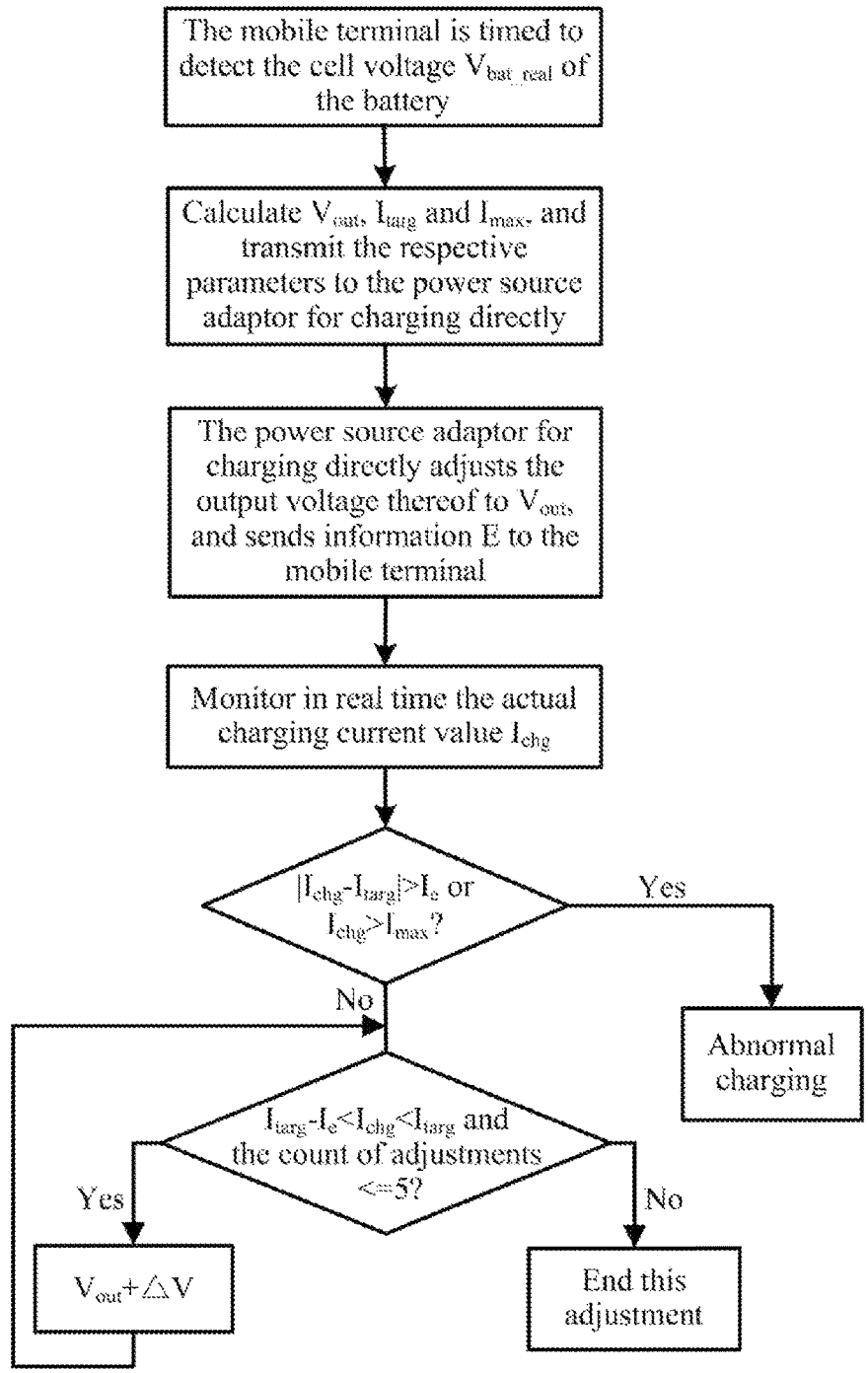
FIG. 8 is a flow chart of control in an embodiment of a voltage-following direct charging control strategy.

As illustrated in FIG. 8, after entering the direct charging process, the microprocessor in the mobile terminal is timed to detect the cell voltage $V_{bat\_real}$ of the battery, calculates the target charging voltage value $V_{out}$, the target charging current value $I_{targ}$, and the charging current maximum value $I_{max}$ in Equations (1) to (4), and sends these values wirelessly to the power source adaptor for charging directly.

The power source adaptor for charging directly adjusts the resistance value of the valid resistor of the digital potentiometer thereof according to the received target charging voltage value $V_{out}$ to thereby adjust the charging voltage output by the AC-DC unit to the target charging voltage value $V_{out}$. At the end of the adjusting, the power source adaptor for charging directly sends information E to the mobile terminal, and also monitors the charging current $I_{chg}$ output by the power source adaptor for charging directly, through the current monitoring chip, and if $|I_{chg}-I_{targ}|>I_e$ or $I_{chg}>I_{max}$, then the power source adaptor for charging directly determines abnormal charging, disconnects the charging power source from being output by the power source adaptor for charging directly to the outside, and notifies the mobile terminal of abnormal charging. If $|I_{chg}-I_{targ}|\leq I_e$ and $I_{chg}\leq I_{max}$, then the power source adaptor for charging directly ends this adjusting process, or starts the charging current self-adjusting algorithm above to finely adjust the charging voltage for at most five times (or another number of times), so that the actual charging current value $I_{chg}$ output by the power source adaptor for charging directly approaches progressively the target charging current value $I_{targ}$ to thereby speed up charging as much as possible.

S406. The mobile terminal determines whether the cell voltage of the battery exceeds the range delimited by the direct charging thresholds, and if not, then the flow returns to the step S405; otherwise, the flow proceeds to a subsequent step.

S407. The microprocessor controls the direct charging switch to be opened to disconnect the direct charging pathway, and instructs the power source adaptor for charging directly to adjust the output voltage thereof to the default constant charging voltage, e.g., 5V direct charging voltage, and to start the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the Mobile Terminal Side (1) The mobile terminal detecting that it is being powered by the power source adaptor for charging directly is timed to send a handshake instruction to the power source adaptor for charging directly, and waits for a preset period of time until the power source adaptor for charging directly feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the direct charging process, if the mobile terminal detects that the power source adaptor for charging directly is pulled out suddenly, then it disconnects the direct charging pathway between the charging interface of the mobile terminal and the battery, and has the charging interface connected with the power source managing chip;

(3) After entering the direct charging process, if the mobile terminal detects that the terminal voltage of the battery exceeds the preset threshold (the threshold of the terminal voltage of the 4.2V chargeable battery can be preset to 4.6V), then it disconnects the direct charging pathway between the charging interface of the mobile terminal and the battery, and instructs the power source adaptor for charging directly to be switched to the default constant charging voltage for output, e.g., 5V DC voltage;

(4) After entering the direct charging process, the mobile terminal monitors in real time the received actual charging current value $I_{chg}$, and if the absolute value of the difference between $I_{chg}$ and $I_{targ}$ goes beyond the preset controllable range of the difference, then it disconnects the direct charging pathway between the charging interface of the mobile terminal and the battery, and switches to the power source managing chip to charge the battery; and (5) After entering the direct charging process, the mobile terminal monitors in real time the received actual charging current value $I_{chg}$, and if $I_{chg}$ is more than $I_{max}$, then it disconnects the direct charging pathway between the charging interface of the mobile terminal and the battery, and notifies the user of the power source adaptor being abnormal 2. At the Power Source Adaptor for Charging Directly Side (1) The power source adaptor for charging directly obtaining the target charging voltage value $V_{out}$, the target charging current value $I_{targ}$, and the charging current maximum value $I_{max}$ monitors in real time its actual output charging current value $I_{chg}$, and if the absolute value of the difference between $I_{chg}$ and $I_{targ}$ goes beyond the preset controllable range of the difference, then the power source adaptor for charging directly stops the charging power source from being out, and flicks a lamp to alert the user;

(2) After entering the direct charging process, the power source adaptor for charging directly monitors in real time its actual output charging current value $I_{chg}$, and if $I_{chg}$ is more than $I_{max}$, then it determines abnormal charging, and disconnects the charging power source from being output to avoid the mobile terminal from being damaged due to being further powered.

The charging method according to this application can be widely applied to a cell phone, a tablet computer, a notebook computer, a mobile power source, and other mobile terminals so as to satisfy different charging demands of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal, comprising:
   a battery configured to store electrical energy;
   a USB interface configured to engage with an external device;
   a wireless communication module configured to transmit and receive a wireless signal;
   a microprocessor configured to, upon detecting the external device inserted into the USB interface:
   control the wireless communication module to search for devices that can communicate wirelessly with the wireless communication module;
   when the searched devices include the external device connected with the USB interface, determine whether the external device is a direct charging power source adaptor;

when the external device is a direct charging power source adaptor, connect the USB interface wirelessly with the power source adaptor;

when the USB interface and the power source adaptor are connected successfully, exchange data with the power source adaptor via the wireless communication module, and detect a voltage of the battery; and when the voltage of the battery lies in a range delimited by preset direct charging thresholds, control a charging voltage output by the power source adaptor to charge the battery, and determine from a current voltage of the battery a value of the charging voltage output by the power source adaptor, wherein the range delimited by the preset direct charging thresholds corresponds with a voltage range of the battery corresponding to a constant-current charging phase in a dedicated charging port (DCP) charging mode.

2. The mobile terminal according to claim 1, further comprising:

a direct charging switch connected between the USB interface and the battery, the microprocessor configured to, upon detecting that the voltage of the battery lies in the range delimited by the preset direct charging thresholds, close the direct charging switch to directly transmit the charging voltage output by the power source adaptor to the battery to charge the battery directly; and a power source managing chip connected between the USB interface and the battery, the microprocessor configured to, upon detecting that the voltage of the battery leaves the range delimited by the preset direct charging thresholds, control the direct charging switch to receive the charging voltage output by the power source adaptor and to charge the battery.

3. A method for charging a mobile terminal, the method comprising:

detecting, by the mobile terminal, an external device inserted into a USB interface of the mobile terminal;

controlling a wireless communication module of the mobile terminal, and searching via the wireless communication module for devices that can communicate wirelessly with the wireless communication module;

when the searched devices include the external device connected with the USB interface, determining whether the external device is a direct charging power source adaptor; and when the external device is a direct charging power source adaptor, connecting the USB interface wirelessly with the power source adaptor;

when the USB interface and the power source adaptor are connected successfully, exchanging, by the mobile terminal, data with the power source adaptor via the wireless communication module; and detecting, by the mobile terminal, a voltage of a battery of the mobile terminal, and when the voltage of the battery lies in a range delimited by preset direct charging thresholds, directly transmitting a charging voltage output by the power source adaptor to the battery to charge the battery directly, and determining a value of the charging voltage output by the power source adaptor from a current voltage of the battery, wherein the range delimited by the preset direct charging thresholds corresponds with a voltage range of the battery corresponding to a constant-current charging phase in a dedicated charging port (DCP) charging mode.

4. The method for charging a mobile terminal according to claim 3, further comprising conducting, by the mobile terminal, Bluetooth communication with the power source adaptor by:

upon detecting the external device inserted into the USB interface of the mobile terminal, controlling, by the mobile terminal, a Bluetooth module to search for external Bluetooth devices;

when the power source adaptor is connected with the USB interface of the mobile terminal, sending a Bluetooth match code to request matching with the power source adaptor;

when the matching succeeds, connecting with the power source adaptor; and after the USB interface and the power source adaptor are connected successfully, exchanging, by the mobile terminal, data with the power source adaptor via the Bluetooth module.

5. The method for charging a mobile terminal according to claim 4, wherein after the mobile terminal detects the external device inserted into the USB interface of the mobile terminal, the charging method further comprises:

detecting whether two differential data pins in the USB interface of the mobile terminal are shorted;

when the two differential data pins are not shorted, determining that the inserted external device is a host, and starting a standard downstream port (SDP) charging mode;

when the two differential data pins are shorted, determining that the inserted external device is a power source adaptor;

starting, by the mobile terminal, a wireless communication function of the mobile terminal, and searching for a direct charging power source adaptor matching therewith; and when no matching direct charging power source adaptor is found, determining that the inserted external device is a normal power source adaptor, and starting a dedicated charging port (DCP) charging mode;

when the matching direct power source adaptor is found, connecting and communicating wirelessly with the matching power source adaptor, wherein two configuration pins in a charging interface of the matching power source adaptor that are connected with the two respective differential data pins of the USB interface of the mobile terminal are shorted.

6. The method for charging a mobile terminal according to claim 4, wherein after the mobile terminal detects the external device inserted into the USB interface of the mobile terminal, the charging method further comprises:

detecting whether two differential data pins in the USB interface of the mobile terminal are shorted;

when the two differential data pins are shorted, determining that the inserted external device is a normal power source adaptor, and starting a dedicated charging port (DCP) charging mode;

when the two differential data pins are not shorted, conducting USB communication with the inserted external device;

when the USB communication succeeds, determining that the inserted external device is a host, and starting a standard downstream port (SDP) charging mode;

when the USB communication does not succeed, starting a wireless communication function of the mobile terminal, and searching for a direct charging power source adaptor matching therewith; and when the matching direct charging power source adaptor is found, connecting and communicating wirelessly with the matching power source adaptor, wherein two configuration pins in a charging interface of the matching power source adaptor that are connected with the two respective differential data pins of the USB interface of the mobile terminal are disconnected.

7. The method for charging a mobile terminal according to claim 3, wherein the voltage of the battery is a cell voltage Vbat_real of the battery, and the battery is charged directly by the power source adaptor in one of the following three direct charging processes:
   (1) searching, by the mobile terminal, a preset reference table using the detected cell voltage Vbat_real of the battery for a target charging voltage value Vout corresponding to an interval in which Vbat_real lies, and sending the target charging voltage value Vout wirelessly to the power source adaptor to determine the value of the charging voltage output by the power source adaptor;
   (2) sending, by the mobile terminal, the detected cell voltage Vbat_real of the battery wirelessly to the power source adaptor, searching via the power source adaptor a preset reference table for a target charging voltage value Vout corresponding to an interval in which Vbat_real lies, and receiving the target charging voltage adjusted and output by the power source adaptor via the USB interface; and
   (3) determining, by the mobile terminal, a charging current maximum value Imax from a maximum terminal voltage supported by the battery and an inner resistance of the battery, determining a target charging current value Itarg corresponding to the current cell voltage Vbat_real of the battery from Imax, and calculating a target charging voltage value Vout from Itarg, a resistance value on a charging line, a resistance valve on a circuit board of the mobile terminal, and the inner resistance of the battery, and sending the target charging voltage value Vout wirelessly to the power source adaptor to determine the value of the charging voltage output by the power source adaptor.

8. The method for charging a mobile terminal according to claim 7, wherein after the mobile terminal detects the external device inserted into the USB interface of the mobile terminal, the charging method further comprises:
   detecting whether two differential data pins in the USB interface of the mobile terminal are shorted;
   when the two differential data pins are not shorted, determining that the inserted external device is a host, and starting a standard downstream port (SDP) charging mode;
   when the two differential data pins are shorted, determining that the inserted external device is a power source adaptor;
   starting, by the mobile terminal, a wireless communication function of the mobile terminal, and searching for a direct charging power source adaptor matching therewith; and
   when no matching direct charging power source adaptor is found, determining that the inserted external device is a normal power source adaptor, and starting a dedicated charging port (DCP) charging mode;
   when the matching direct charging power source adaptor is found, connecting and communicating wirelessly with the matching power source adaptor, wherein two configuration pins in a charging interface of the matching power source adaptor that are connected with the two respective differential data pins of the USB interface of the mobile terminal are shorted.

9. The method for charging a mobile terminal according to claim 7, wherein after the mobile terminal detects the external device inserted into the USB interface of the mobile terminal, the charging method further comprises:
   detecting whether two differential data pins in the USB interface of the mobile terminal are shorted;
   when the two differential data pins are shorted, determining that the inserted external device is a normal power source adaptor, and starting a dedicated charging port (DCP) charging mode;
   when the two differential data pins are not shorted, conducting USB communication with the inserted external device;
   when the USB communication succeeds, determining that the inserted external device is a host, and starting a standard downstream port (SDP) charging mode;
   when the USB communication does not succeed, starting a wireless communication function of the mobile terminal, and searching for a power source adaptor for charging directly matching therewith; and
   when the matching power source adaptor for charging directly is found, connecting and communicating wirelessly with the matching power source adaptor, wherein two configuration pins in a charging interface of the matching power source adaptor that are connected with the two respective differential data pins of the USB interface of the mobile terminal are disconnected.

10. The method for charging a mobile terminal according to claim 3, wherein:
    the range delimited by the direct charging thresholds is defined by values [S1, S2];
    when the voltage of the battery is less than S1, the charging voltage output by the power source adaptor is transmitted to a power source managing chip in the mobile terminal, the battery is pre-charged by the power source managing chip at a small current, and when the voltage of the battery is greater than S2, the battery is charged by the power source managing chip at a constant voltage; and
    when the voltage of the battery leaves the range delimited by the direct charging thresholds, the mobile terminal sends a wireless instruction to the power source adaptor to instruct the power source adaptor to output the constant charging voltage by default.

11. The method for charging a mobile terminal according to claim 10, wherein after the mobile terminal detects the external device inserted into the USB interface of the mobile terminal, the charging method further comprises:
    detecting whether two differential data pins in the USB interface of the mobile terminal are shorted;
    when the two differential data pins are not shorted, determining that the inserted external device is a host, and starting a standard downstream port (SDP) charging mode;
    when the two differential data pins are shorted, determining that the inserted external device is a power source adaptor;
    starting, by the mobile terminal, a wireless communication function of the mobile terminal, and searching for a direct charging power source adaptor matching therewith; and
    when no matching direct charging power source adaptor is found, determining that the inserted external device is a normal power source adaptor, and starting a dedicated charging port (DCP) charging mode;

when the matching direct charging power source adaptor is found, connecting and communicating wirelessly with the matching power source adaptor, wherein two configuration pins in a charging interface of the matching power source adaptor that are connected with the two respective differential data pins of the USB interface of the mobile terminal are shorted.

12. The method for charging a mobile terminal according to claim 10, wherein after the mobile terminal detects the external device inserted into the USB interface of the mobile terminal, the charging method further comprises:
detecting whether two differential data pins in the USB interface of the mobile terminal are shorted;
when the two differential data pins are shorted, determining that the inserted external device is a normal power source adaptor, and starting a dedicated charging port (DCP) charging mode;
when the two differential data pins are not shorted, conducting USB communication with the inserted external device;
when the USB communication succeeds, determining that the inserted external device is a host, and starting a standard downstream port (SDP) charging mode;
when the USB communication does not succeed, starting a wireless communication function of the mobile terminal, and searching for a power source adaptor for charging directly matching therewith; and
when the matching power source adaptor for charging directly is found, connecting and communicating wirelessly with the matching power source adaptor, wherein two configuration pins in a charging interface of the matching power source adaptor that are connected with the two respective differential data pins of the USB interface of the mobile terminal are disconnected.

13. The method for charging a mobile terminal according to claim 3, wherein after the mobile terminal detects the external device inserted into the USB interface of the mobile terminal, the charging method further comprises:
detecting whether two differential data pins in the USB interface of the mobile terminal are shorted;
when the two differential data pins are not shorted, determining that the inserted external device is a host, and starting a standard downstream port (SDP) charging mode;
when the two differential data pins are shorted, determining that the inserted external device is a power source adaptor;
starting, by the mobile terminal, a wireless communication function of the mobile terminal, and searching for a direct charging power source adaptor matching therewith; and
when no matching direct charging power source adaptor is found, determining that the inserted external device is a normal power source adaptor, and starting a dedicated charging port (DCP) charging mode;
when the matching direct charging power source adaptor is found, connecting and communicating wirelessly with the matching power source adaptor, wherein two configuration pins in a charging interface of the matching power source adaptor that are connected with the two respective differential data pins of the USB interface of the mobile terminal are shorted.

14. The method for charging a mobile terminal according to claim 3, wherein after the mobile terminal detects the external device inserted into the USB interface of the mobile terminal, the charging method further comprises:
detecting whether two differential data pins in the USB interface of the mobile terminal are shorted;
when the two differential data pins are shorted, determining that the inserted external device is a normal power source adaptor, and starting a dedicated charging port (DCP) charging mode;
when the two differential data pins are not shorted, conducting USB communication with the inserted external device;
when the USB communication succeeds, determining that the inserted external device is a host, and starting a standard downstream port (SDP) charging mode;
when the USB communication does not succeed, starting a wireless communication function of the mobile terminal, and searching for a direct charging power source adaptor matching therewith; and
when the matching direct charging power source adaptor is found, connecting and communicating wirelessly with the matching power source adaptor, wherein two configuration pins in a charging interface of the matching power source adaptor that are connected with the two respective differential data pins of the USB interface of the mobile terminal are disconnected.

15. A method for charging using a direct charging power source adaptor, the method comprising:
connecting, by the direct charging power source adaptor, with a mobile terminal, after connecting with an external AC input power source or upon detecting that a charging interface of the power source adaptor is connected with the mobile terminal;
controlling a wireless communication module of the power source adaptor, and waiting for a wireless connection with the mobile terminal; and
after the power source and the mobile terminal are connected successfully, exchanging data with the mobile terminal via the wireless communication module, and determining from a current voltage of a battery of the mobile terminal a value of a charging voltage output by the power source adaptor.

16. The method for charging using a direct charging power source adaptor according to claim 15, further comprising conducting, by the power source adaptor, Bluetooth communication with the mobile terminal by:
after connecting with the external AC input power source or upon detecting that the charging interface of the power source adaptor is connected with the mobile terminal, controlling, by the power source adaptor, a Bluetooth module of the mobile terminal for searching;
upon reception of a Bluetooth match code sent by the mobile terminal, feeding, by the power source adaptor, the same Bluetooth match code to the mobile terminal for matching;
after the mobile terminal and the power source adaptor are matched successfully, receiving, by the power source adaptor, a connection request from the mobile terminal, and connecting wirelessly with the mobile terminal; and
after the mobile terminal and the power source adaptor are connected successfully, exchanging, by the power source adaptor, data with the mobile terminal via the Bluetooth module.

17. The method for charging using a direct charging power source adaptor according to claim 16, wherein:
the power source adaptor adjusts the charging voltage output by the power source adaptor to a target charging voltage value Vout sent by the mobile terminal; or the power source adaptor searches, using the voltage of the battery sent by the mobile terminal, a reference table preset in the power source adaptor for a target charging voltage value Vout corresponding to the current voltage of the battery, feeds the target charging voltage value Vout back to the mobile terminal, and adjusts the charging voltage output by the power source adaptor to the target charging voltage value Vout.

18. The method for charging using a direct charging power source adaptor according to claim 15, wherein:

the power source adaptor adjusts the charging voltage output by the power source adaptor to a target charging voltage value Vout sent by the mobile terminal; or the power source adaptor searches, using the voltage of the battery sent by the mobile terminal, a reference table preset in the power source adaptor for a target charging voltage value Vout corresponding to the current voltage of the battery, feeds the target charging voltage value Vout back to the mobile terminal, and adjusts the charging voltage output by the power source adaptor to the target charging voltage value Vout.

19. The method for charging using a direct charging power source adaptor according to claim 18, wherein:

the power source adaptor receives a target charging current value Itarg and a charging current maximum value Imax sent by the mobile terminal, or searches the reference table for the target charging current value Itarg and the charging current maximum value Imax, corresponding to the current voltage of the battery; and the power source adaptor monitors a charging current Ichg output by the power source adaptor, and when Itarg−Ie≤Ichg<Itarg, the power source adaptor progressively increases the charging voltage output by the power source adaptor by an amount of $\Delta V$ so an actual charging current Ichg output by the power source adaptor approaches the target charging current value Itarg, or if an absolute value of a difference between Ichg and Itarg is more than Ie or Ichg is more than Imax, the power source adaptor stops outputting the charging voltage;

wherein Ie represents a controllable range of a difference between the actual charging current value of the power source adaptor and the target charging current value.

* * * * *